United States Patent
Kumaki et al.

(10) Patent No.: US 6,968,011 B2
(45) Date of Patent: Nov. 22, 2005

(54) MOTION VECTOR DETECTING DEVICE IMPROVED IN DETECTION SPEED OF MOTION VECTORS AND SYSTEM EMPLOYING THE SAME DEVICES

(75) Inventors: Satoshi Kumaki, Hyogo (JP); Tetsuya Matsumura, Hyogo (JP); Atsuo Hanami, Hyogo (JP); Yoshinori Matsuura, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 544 days.

(21) Appl. No.: 10/155,993

(22) Filed: May 29, 2002

(65) Prior Publication Data

US 2003/0086497 A1 May 8, 2003

(30) Foreign Application Priority Data

Nov. 8, 2001  (JP) .............................. 2001-342862

(51) Int. Cl.[7] .............................................. H04N 7/12
(52) U.S. Cl. ........................... 375/240.16; 375/240.21; 382/107
(58) Field of Search ...................... 375/240.16, 240.21, 375/240.24; 382/103, 107, 164; 348/699, 348/416.1

(56) References Cited

U.S. PATENT DOCUMENTS 6,380,986 B1 * 4/2002 Minami et al. ............. 348/699
6,535,632 B1 * 3/2003 Park et al. .................. 382/164
6,687,303 B1 * 2/2004 Ishihara ................. 375/240.21
6,741,725 B2 * 5/2004 Astle .......................... 382/103

FOREIGN PATENT DOCUMENTS

JP        2000-270328        9/2000

OTHER PUBLICATIONS

U.S. Appl. No. 09/420,572, filed Dec. 14, 1999, Shinichi Miyake et al.
Partial English Translation of The Journal of the Institute of Television Engineers of Japan, vol. 49, No. 4, Apr. 1995, The Institute of Television Engineers of Japan, pp. 418-419, (w/ copy of original document).

* cited by examiner

Primary Examiner—Gims Philippe
(74) Attorney, Agent, or Firm—McDermott Will & Emery LLP

(57) ABSTRACT

The control circuit controls output of template block data held in the input section such that a plurality of operation units within the operation section are provided with data of unadjacent template blocks that are different from each other. The operation units within the operation section detect motion vectors according to the template block data provided thereto. Thus, motion vector detection in the template blocks except for those in a region on a display screen requiring no motion vector detection is distributed in the plurality of operation units. Accordingly, the motion vector search can be performed in a wider range in a vertical or horizontal direction than in the conventional case within the same operation time.

8 Claims, 19 Drawing Sheets

● VALID PIXEL
○ INVALID PIXEL

TEMPLATE DATA        SEARCH WINDOW DATA

MOTION VECTOR DETECTING DEVICE IMPROVED IN DETECTION SPEED OF MOTION VECTORS AND SYSTEM EMPLOYING THE SAME DEVICES

BACKGROUND OF THE INVENTION

1. Field of the Invention

The present invention relates to techniques for detecting motion vectors used for motion compensation of motion pictures, and more particularly, to a motion vector detecting device improved in detection speed of motion vectors and capable of performing detection in a wider range within the same processing time and a motion vector detecting system using a plurality of such devices.

2. Description of the Background Art

In recent years, multimedia techniques have been widely studied in various fields. Among them, a technique for coding motion picture signals having a huge volume of data has become very important. For transmitting and storing motion picture data having such a huge volume of data, a data compressing technique is indispensable for reducing the data amount.

Motion picture data generally includes considerable redundancy caused, e.g., by correlation between neighboring pixels and visual properties of human beings. A data compression technique suppressing the redundancy of the motion picture data to reduce the data amount to be transmitted is called high efficiency coding. An inter-frame predictive coding method as one of such high efficiency coding methods will now be explained.

In the inter-frame predictive coding method, a prediction error, or a difference between pixel data in a current frame to be coded and pixel data at the corresponding position in a reference frame temporally preceding or succeeding the current frame, is calculated (hereinafter, this also includes the case of calculating a prediction error on a field basis). The prediction error calculated is used for the subsequent coding. According to this inter-frame predictive coding method, high efficiency coding is possible for images containing less motion, since there is high correlation between the frames. If the images contain large motion, however, a large error occurs due to small correlation between the frames, to disadvantageously increase the data amount to be transmitted.

A motion-compensated inter-frame predictive coding method is proposed as a method for overcoming the above-described problem. According to this motion-compensated inter-frame predictive coding method, motion vectors are calculated, prior to calculation of prediction errors, employing pixel data in a current frame and in a reference frame preceding or succeeding the current frame. Prediction images of the reference frame are then moved in accordance with the motion vectors calculated.

More specifically, image data of the reference frame offset in position by the motion vectors is defined as reference pixels, which are used as prediction values. The prediction errors are calculated between the pixels in the reference frame after movement and in the current frame. The prediction errors and the motion vectors are then transmitted.

FIG. 1 is a block diagram showing a schematic configuration of a conventional motion vector detecting device using a motion-compensated inter-frame predictive coding method. This motion vector detecting device is for coding pixels on a frame basis, and includes: an input section 101 which receives image data, performs a filtering process on pixels, and outputs search window (SW) data and template block (TB) data in a prescribed timing; an operation section 102 which calculates three sets of evaluation values (sums of absolute difference values) related to displacement vectors for respective template blocks, based on the search window data and template block data output from input section 101; and a comparison section 103 which compares the evaluation values calculated by operation section 102 to obtain minimum values of the respective evaluation values, and determines respective displacement vectors corresponding to the minimum evaluation values as motion vectors.

FIG. 2 illustrates details of input section 101. Input section 101 includes: a filtering operator 110 which performs filtering and precision round-off processes on the input data; an SW memory 111 which stores the search window data having undergone the filtering process of filtering operator 110; and a TB memory 112 which stores the template block data having undergone the filtering process of filtering operator 110.

Filtering operator 110 successively receives and performs the filtering process on the search window data and template block data from a frame memory (not shown), and writes the filtered search window data and template block data into SW memory 111 and TB memory 112, respectively.

FIG. 3 illustrates, by way of example, an operation of operation section 102. Operation section 102 searches pixels in a range from −128 to +127 in a horizontal direction and from −48 to +47 in a vertical direction with respect to a template block (TB). Since the template block data and the search window data are each sub-sampled to 4:1, the search of pixels from −128 to +127 in the horizontal direction is performed for the pixels of multiples of 4.

FIG. 4 shows the template block data and search window data sub-sampled to 4:1 from 16×16 pixels to 16×4 pixels.

FIG. 5 illustrates details of operation section 102. Operation section 102 includes: a plurality of operation units 120–123, each including a plurality of processing elements arranged in an array and an adder circuit which adds operation results (absolute difference values) output from the processors in a predetermined order to obtain a total sum; search window data shift units 124 and 125; and a search window data buffer 126.

FIG. 6 shows a configuration of each operation unit 120–123. Each operation unit 120–123 includes: processing elements PE00–PE3F arranged in 4 columns and 16 rows corresponding to arrangement of the template blocks; and an adder circuit 127 which adds operation results of processing elements PE00–PE3F. Each processing element PE00–PE3F is connected with a bus for transferring template block data, and is provided with search window data different from each other.

Processing elements PE00–PE3F store data of a plurality of template blocks each corresponding to a representative position of a plurality of pixels on an image screen adjacent to each other in a lateral direction, and calculates, in a time-sharing manner, evaluation values representing degrees of correlation between the data of the plurality of template blocks and the search window data corresponding to a certain displacement point. In processing elements PE00–PE3F, the template block data is held during a cycle in which motion vectors related to the relevant template blocks are being obtained. The search window data is shifted pixel by pixel within search window data shift unit 124 or 125, and is subjected to the operation of processing elements PE00–PE3F together with the template block data.

FIG. 7 shows a configuration of each search window data shift unit 124, 125. Search window data shift units 124 and 125 each include registers SR00–SRF3F arranged in 4 columns and 16 rows, which are connected in a line, except for those sandwiching search window data buffer 126 therebetween, to transfer data in one direction.

FIG. 8 shows a configuration of search window data buffer 126. Search window data buffer 126 includes two sets of FIFO (First In First Out) 128 and 129, and eight selectors 130–137. FIFO 128 and 129 correspond to search window data shift units 124 and 125, respectively. FIFO 128 and 129 each have capacity of 48 words (96 pixels×4), and hold and successively output data of 96 pixels, thereby functioning as delay circuits of 96 cycles.

FIG. 9 illustrates connection between search window data shift units 124, 125 and search window data buffer 126 in a 4:1 sub-sampling mode. As shown in FIG. 9, two search window data shift units 124 and 125 are provided with a common output of search window data buffer 126 and receive the same search window data.

FIG. 10 is a block diagram showing a schematic configuration of processing element PE00–PE3F included in operation unit 120–123. Processing elements PE00–PE3F each include: four template block registers TMBR0–TMBR3 which store data of a plurality of template blocks; a selector 140 which selects data output from registers TMBR0–TMBR3 or a fixed value; a selector 141 which selects search window data or a fixed value; and an absolute difference value operator 142.

The search window data is transferred from search window data buffer 126 into search window data shift unit 124 or 125, and provided to absolute difference value operators 142 included in processing elements PE00–PE3F corresponding to registers SR00–SRF3F within search window data shift unit 124 or 125. The template block data is provided via a common bus and stored in template block registers TMBR0–TMBR3 within a selected processing element PE00–PE3F. The fixed values are selected as outputs of selectors 140 and 141 in a cycle requiring no operation as in the case of out of range of search.

FIG. 11A shows an image of one frame divided into blocks each consisting of 16×16 pixels. The image is divided into 16 template blocks TB1–TB16 in a horizontal direction. FIG. 11B shows a block of 16×16 pixels having undergone sub-sampling. Input section 101 sub-samples neighboring four pixels in the horizontal direction to one pixel, and generates a block of 4×16 pixels from the block of 16×16 pixels.

Assume that the motion vector detecting device detects three motion vectors for template block TB8 shown in FIG. 11A. The three motion vectors are: a motion vector corresponding to template block TB8 of 4×16 pixels shown in FIG. 11B; a motion vector corresponding to an odd sub-template block $TB8_O$ of 4×8 pixels that is composed of only the pixels in the odd fields of the template block TB8; and a motion vector corresponding to an even sub-template block $TB8_E$ of 4×8 pixels composed of only the pixels in the even fields of template block TB8.

FIG. 12 shows a state of search window data in search window data shift unit 124 or 125 at a certain time point. Registers TMBR0–TMBR3 in operation unit 120 store data of template blocks TB1, TB2, TB3 and TB4, respectively. Registers TMBR0–TMBR3 in operation unit 121 store data of respective template blocks TB5–TB8. Registers TMBR0–TMBR3 in operation unit 122 store data of template block TB9–TB12, respectively, and registers TMBR0–TMBR3 in operation unit 123 store data of respective template blocks TB13–TB16.

A respective processing element within operation units 120–123 stores pixel data in the four template blocks at the corresponding positions on the image screen. As for the search window data, all the data shown in FIG. 12 are stored in search window data shift unit 124 or 125 and search window data buffer 126. Specifically, search window data shift unit 124 or 125 stores search window data of 4×16 pixels in an upper portion of the screen, and search window data buffer 126 stores search window data in the remaining, lower portion of the screen.

In this state, with respect to template block TB8, operations for a frame displacement vector (0, −48) of the template block, a field displacement vector (0, −24) for the odd fields of the odd sub-template block, and a field displacement vector (0, −24) for the even fields of the even sub-template block are possible.

The template blocks on the left side of template block TB8 have horizontal vectors offset in units of +16. The template blocks on the right side of template block TB8 have horizontal vectors offset in units of −16. In this state, each processing element PE00–PE3F obtains absolute difference values between the template block data stored in its own registers TMBR0–TMBR3 and the search window data output from search window data shift unit 124 or 125.

The absolute difference values obtained in respective processing elements PE00–PE3F are transferred to adder circuit 127. Adder circuit 127 calculates a total sum of the absolute difference values corresponding to the odd sub-template block and a total sum of the absolute difference values corresponding to the even sub-template block, independently from each other, and adds the sums to obtain a total sum of the absolute difference values corresponding to the template block. The evaluation values for the three sets of displacement vectors as described above are thus calculated. Since each processing element PE00–PE3F holds four kinds of template block data in its registers TMBR0–TMBR3, the search window data is fixed for four cycles, and evaluation values for the respective template block data are sequentially calculated one at each cycle of the four cycles.

Next, the search window data is transferred by one pixel, while the template block data is being held in each processing element PE00–PE3F. FIG. 13 shows a state of the search window data in search window data shift unit 124 or 125 when one pixel of the search window data has been transferred. This corresponds to the state having a frame displacement vector (0, −47) of the template block, a field displacement vector (0, −24) for the odd fields of the odd sub-template block, and a field displacement vector (0, −23) for the even fields of the even sub-template block, with respect to template block TB8. In this state, the operations for obtaining absolute difference values and total sums as described above are carried out again, so that the evaluation values corresponding to the relevant three displacement vectors are obtained.

The transferring operation of one horizontal displacement of the search window data as described above is repeated by the number of vertical displacement (96 in total from −48 to +47) to complete the vector search for one horizontal displacement. Thereafter, solely the transferring operation of the search window data (with no operation) is repeated 16 times (by 16 cycles), and a state as shown in FIG. 14 enabling evaluation of a next horizontal displacement vector at a first vertical displacement point is obtained.

Vector evaluation at necessary displacement points can be sequentially performed by repeating the above-described operations. Comparison section 103 obtains, for all the calculated evaluation values, three minimum evaluation values for each template block, and determines the corresponding displacement vectors as motion vectors for the template block, the odd sub-template block and the even sub-template block.

In the motion vector detecting device as described above, however, each processing element PE00–PE3F holds template block data corresponding to four neighboring template blocks in registers TMBR0–TMBR3, and the search window data is fixed for four cycles. Evaluation values for the separate template block data should be calculated sequentially one at each of the four cycles, hindering improvement in processing speed of motion vector detection.

SUMMARY OF THE INVENTION

An object of the present invention is to provide a motion vector detecting device which permits motion vector search in a wider range in a vertical direction than in a conventional motion vector detecting device within the same operation time.

Another object of the present invention is to provide a motion vector detecting device which permits motion vector search in a wider range in a horizontal direction than in a conventional motion vector detecting device within the same operation time.

A further object of the present invention is to provide a motion vector detecting system which permits motion vector search at different sub-sampling rates in different regions employing a plurality of motion vector detecting devices having the same sub-sampling rate.

According to an aspect of the present invention, the motion vector detecting device includes: an input section which receives and holds template block data and search window data; an operation section having a plurality of operation units which calculate evaluation values between the template block data held in the input section and the search window data corresponding to an arbitrary displacement point within the search window data held in the input section; a comparison section which compares the evaluation values calculated by the operation section to detect a motion vector; and a control circuit which controls output of the template block data held in the input section such that the plurality of operation units are provided with data of unadjacent template blocks that are different from each other.

The control circuit provides a plurality of operation units with data of unadjacent template blocks different from each other. Thus, detection of motion vectors in the template blocks within a display screen except for those in a region where motion vector detection is unnecessary can be distributed in the plurality of operation units. Accordingly, it is possible to perform motion vector search in a wider range in a vertical or horizontal direction than in the conventional case within the same operation time.

According to another aspect of the present invention, the motion vector detecting system employs, in a horizontal direction, a plurality of motion vector detecting devices of the same sub-sampling rate, to detect motion vectors in a plurality of regions. At least one of the plurality of motion vector detecting devices is included in another plurality of motion vector detecting devices. The at least one motion vector detecting device and the another plurality of motion vector detecting devices perform motion vector detection using template block data and search window data having thinned-out positions different from each other.

Thus, by adding the evaluation values output from the at least one motion vector detecting device and the another plurality of motion vector detecting devices, it becomes possible to perform motion vector search at different sub-sampling rates in different regions.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
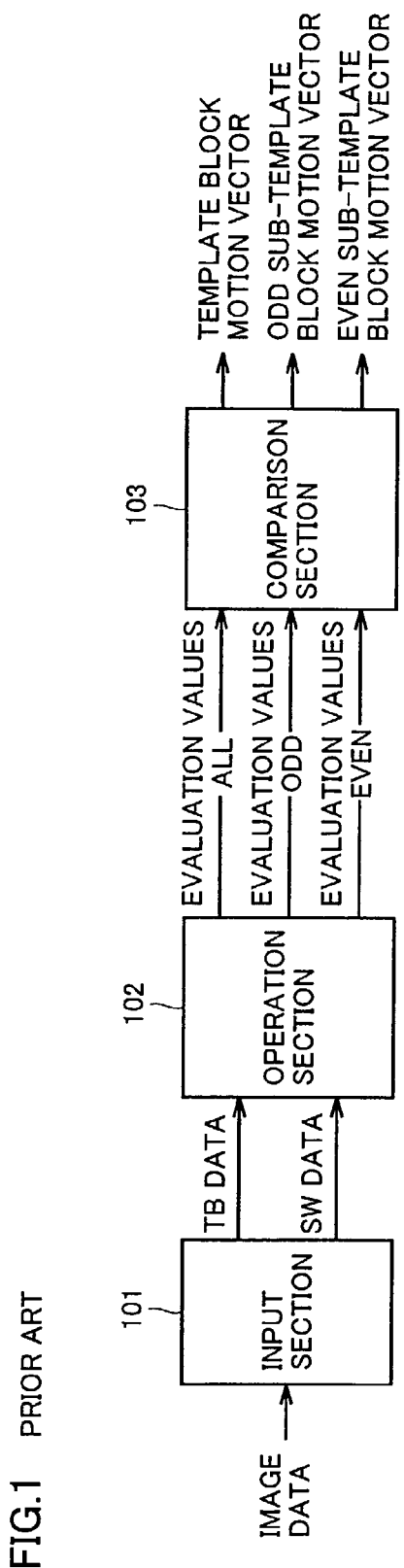
FIG. 1 is a block diagram showing a schematic configuration of a conventional motion vector detecting device using a motion-compensated inter-frame predictive coding method.
Figure 2:
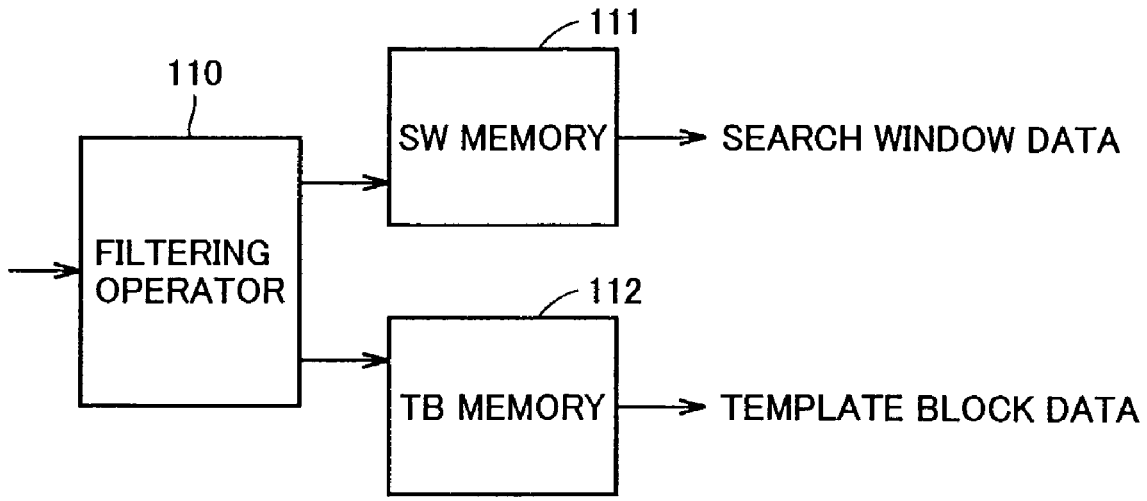
FIG. 2 illustrates details of input section 101.
Figure 3:
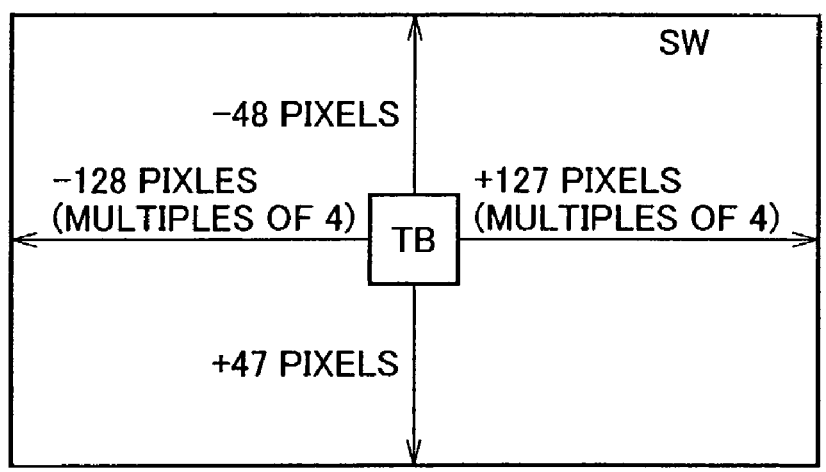
FIG. 3 illustrates, by way of example, the operation of operation section 102.
Figure 4:
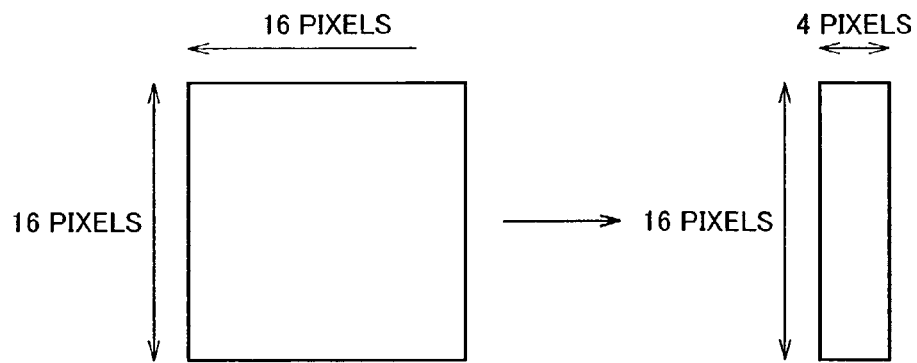
FIG. 4 shows template block data and search window data sub-sampled to 4:1.
Figure 5:
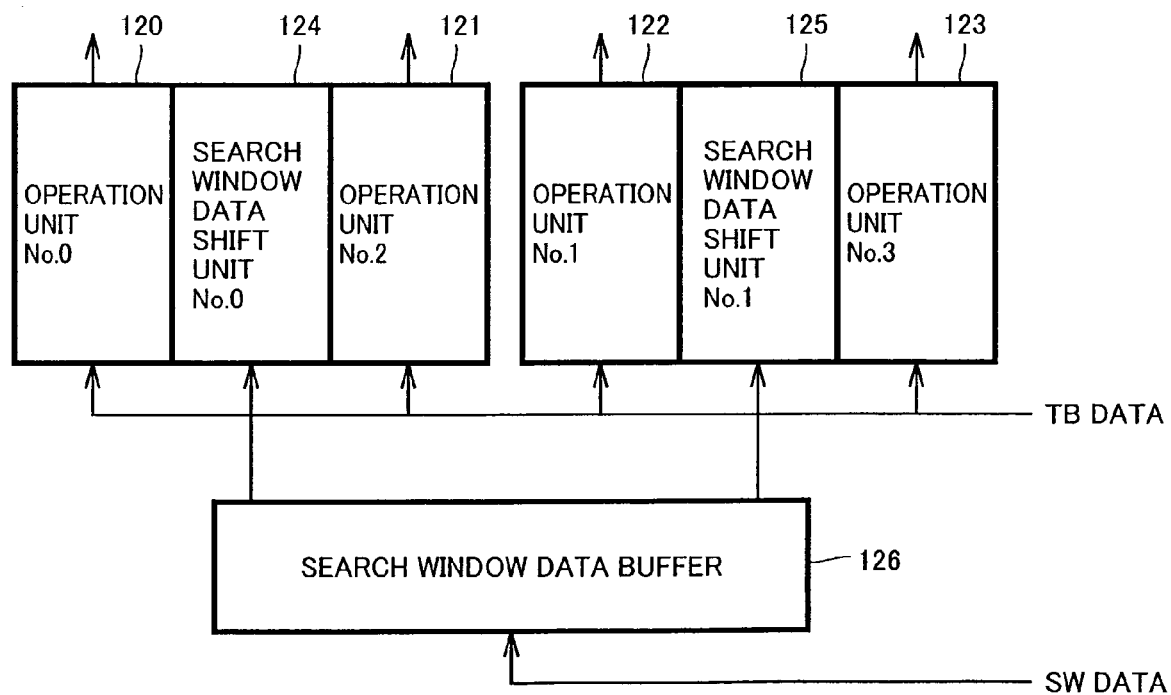
FIG. 5 illustrates details of operation section 102.
Figure 6:
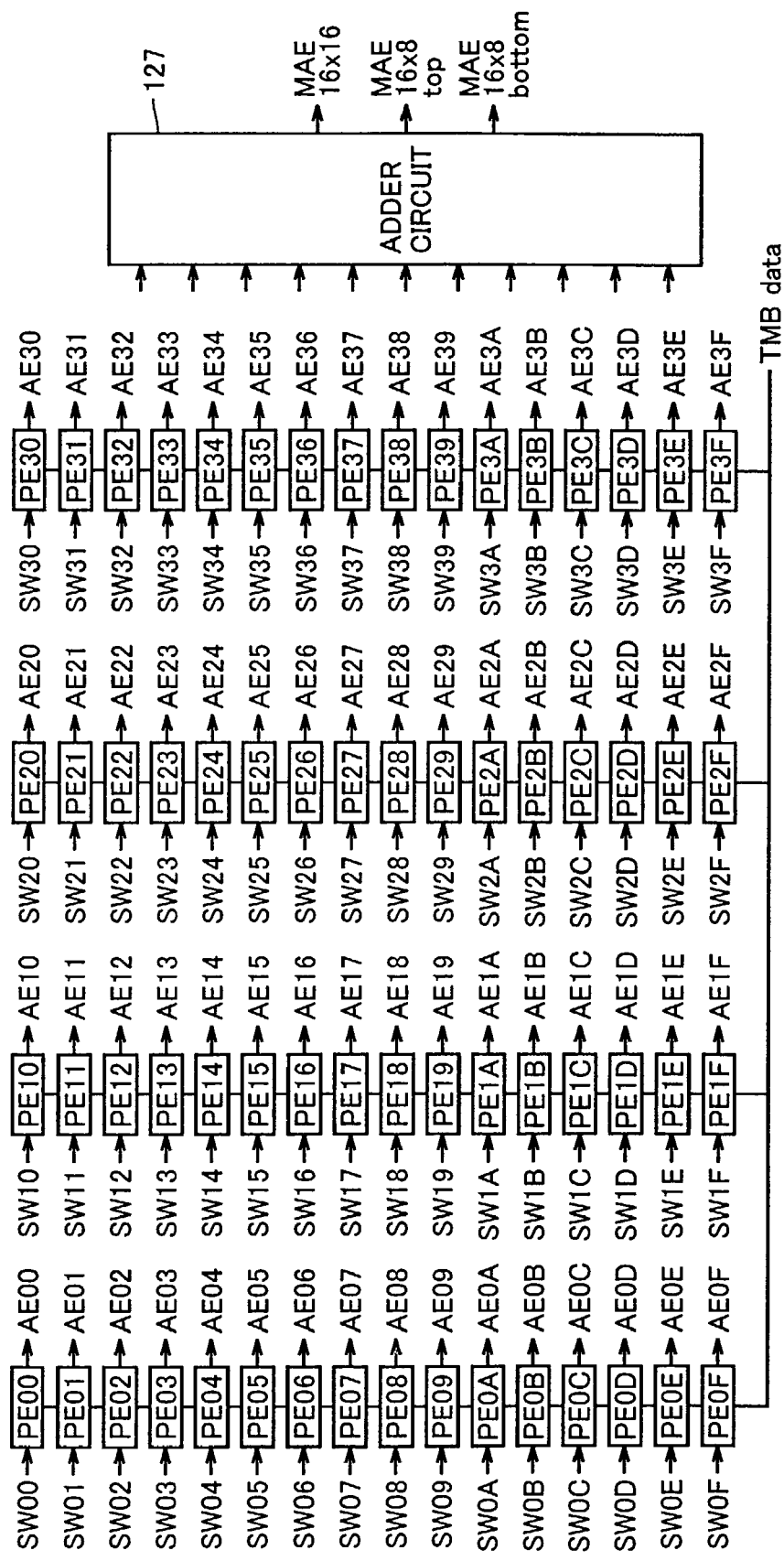
FIG. 6 shows a configuration of each operation section 120–123.
Figure 7:
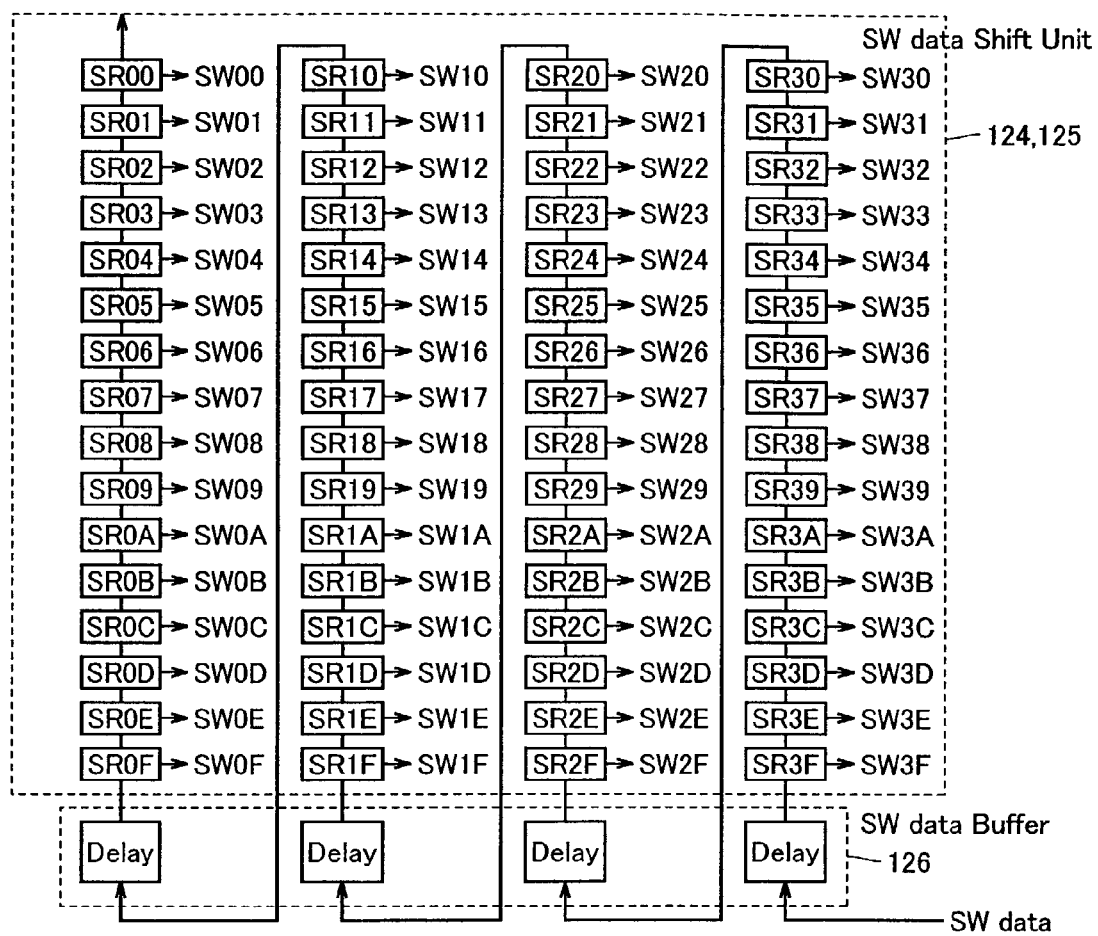
FIG. 7 shows a configuration of each search window data shift unit 124, 125.
Figure 8:
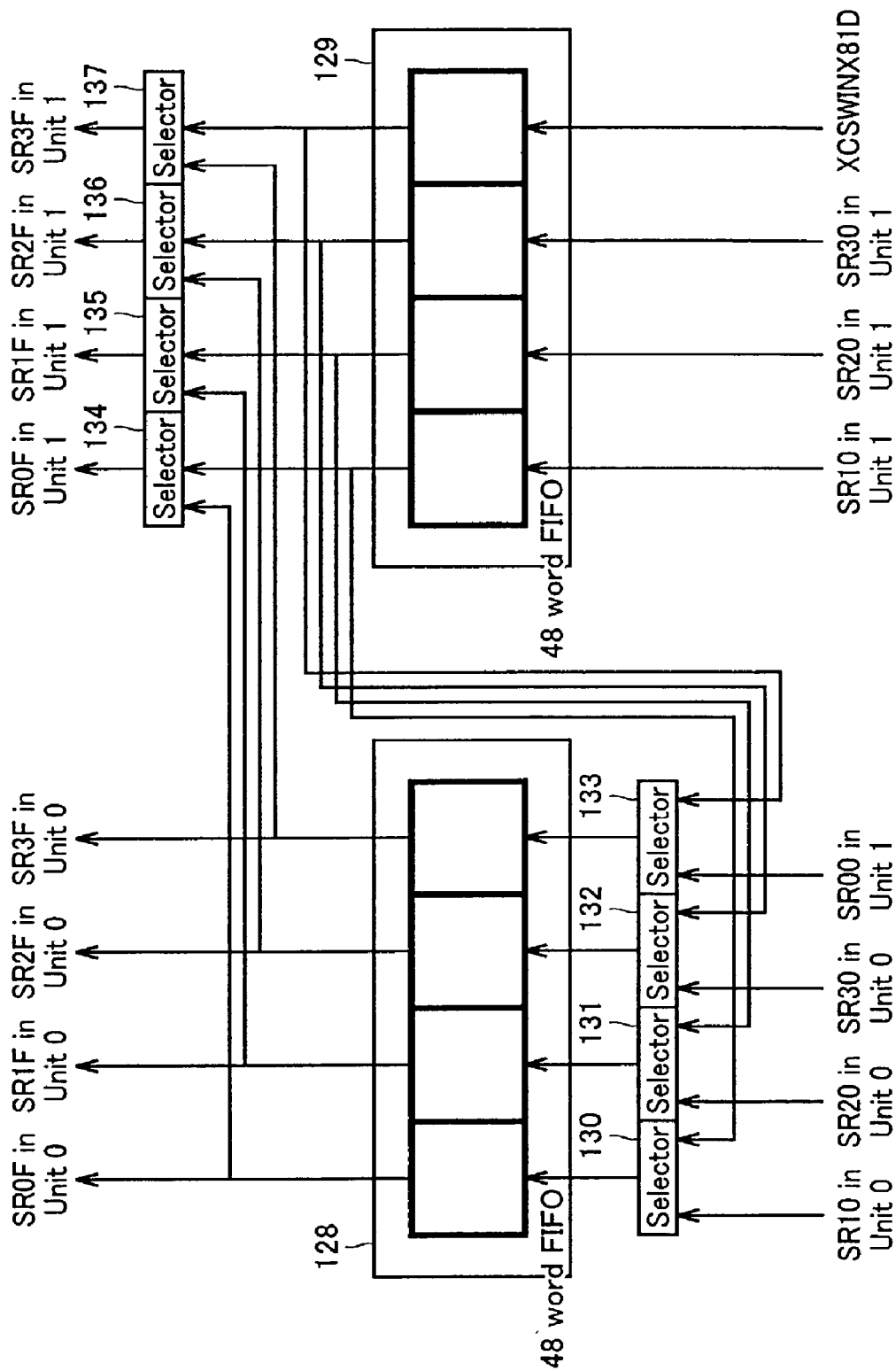
FIG. 8 shows a configuration of search window data buffer 126.
Figure 9:
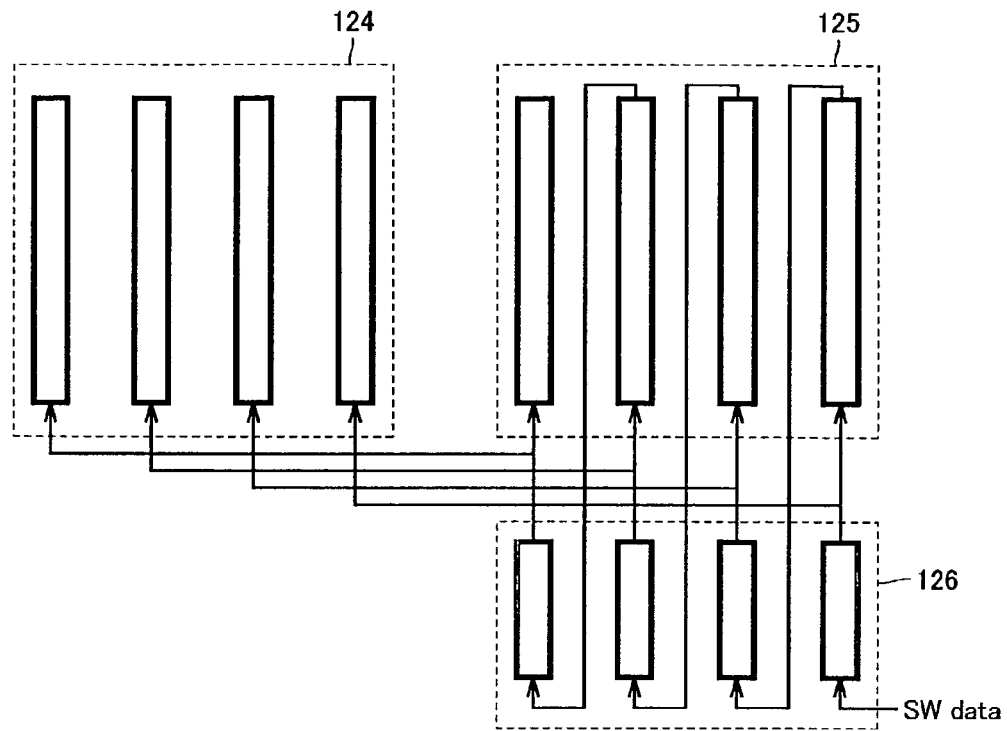
FIG. 9 illustrates connection between search window data shift units 124, 125 and search window data buffer 126 in the 4:1 sub-sampling mode.
Figure 10:
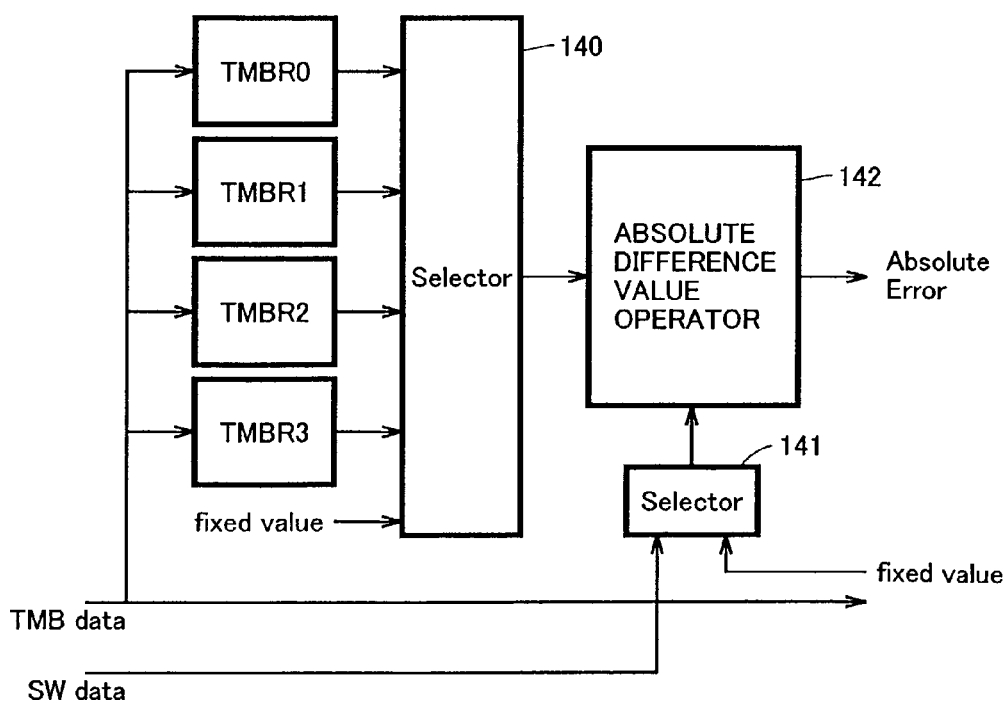
FIG. 10 is a block diagram showing a schematic configuration of each processing element PE00–PE3F included in operation units 120–123.
Figure 11A:
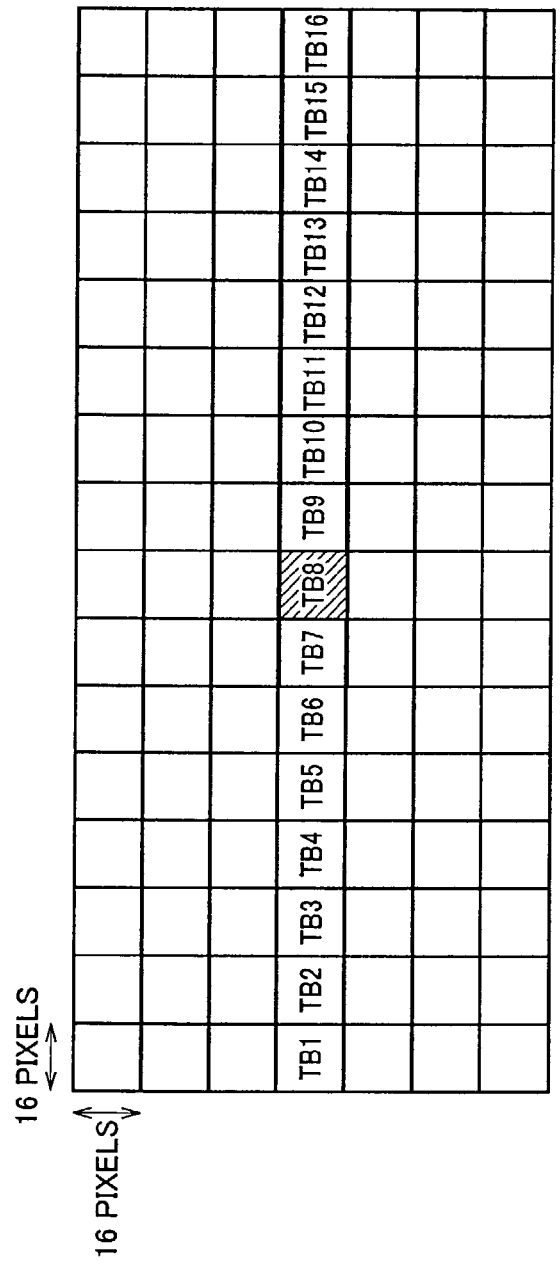
FIG. 11A shows an image of one frame divided into blocks each consisting of 16 pixels by 16 pixels.
Figure 11B:
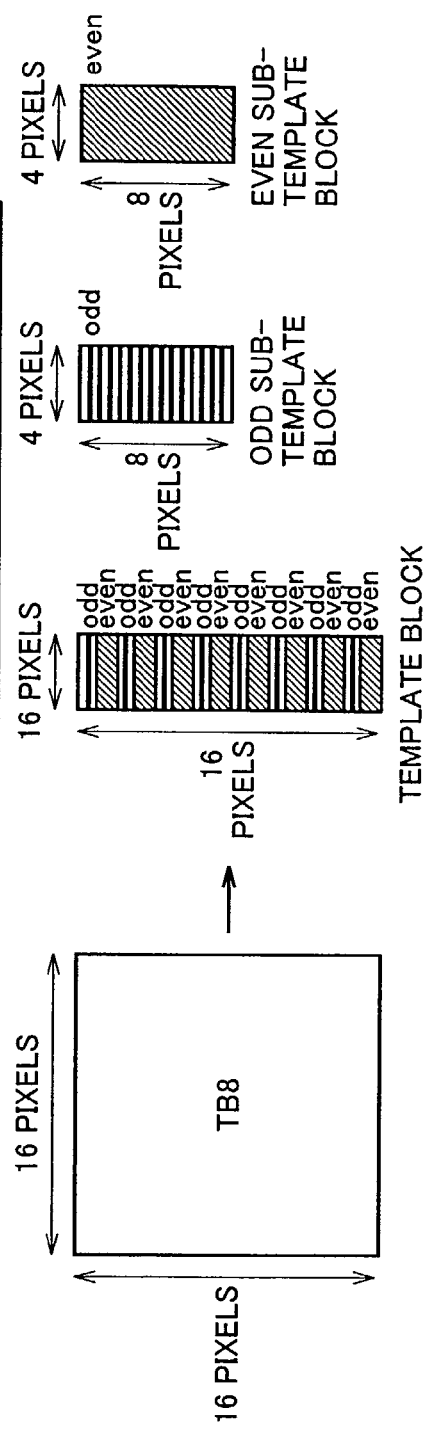
FIG. 11B shows the block of 16×16 pixels having undergone sub-sampling.
Figure 12:
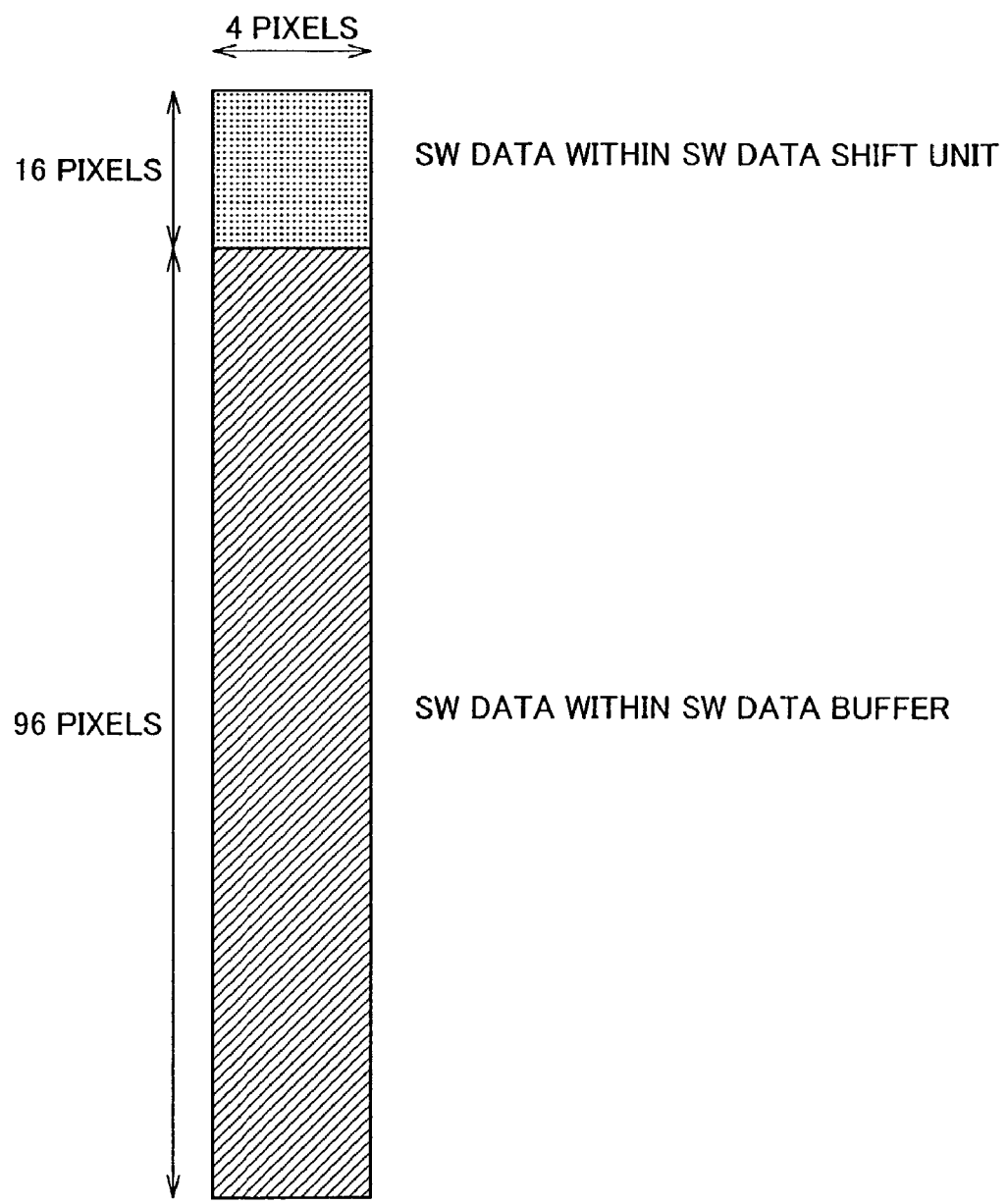
FIG. 12 shows a state of search window data in search window data shift unit 124 or 125 at a certain time point.
Figure 13:
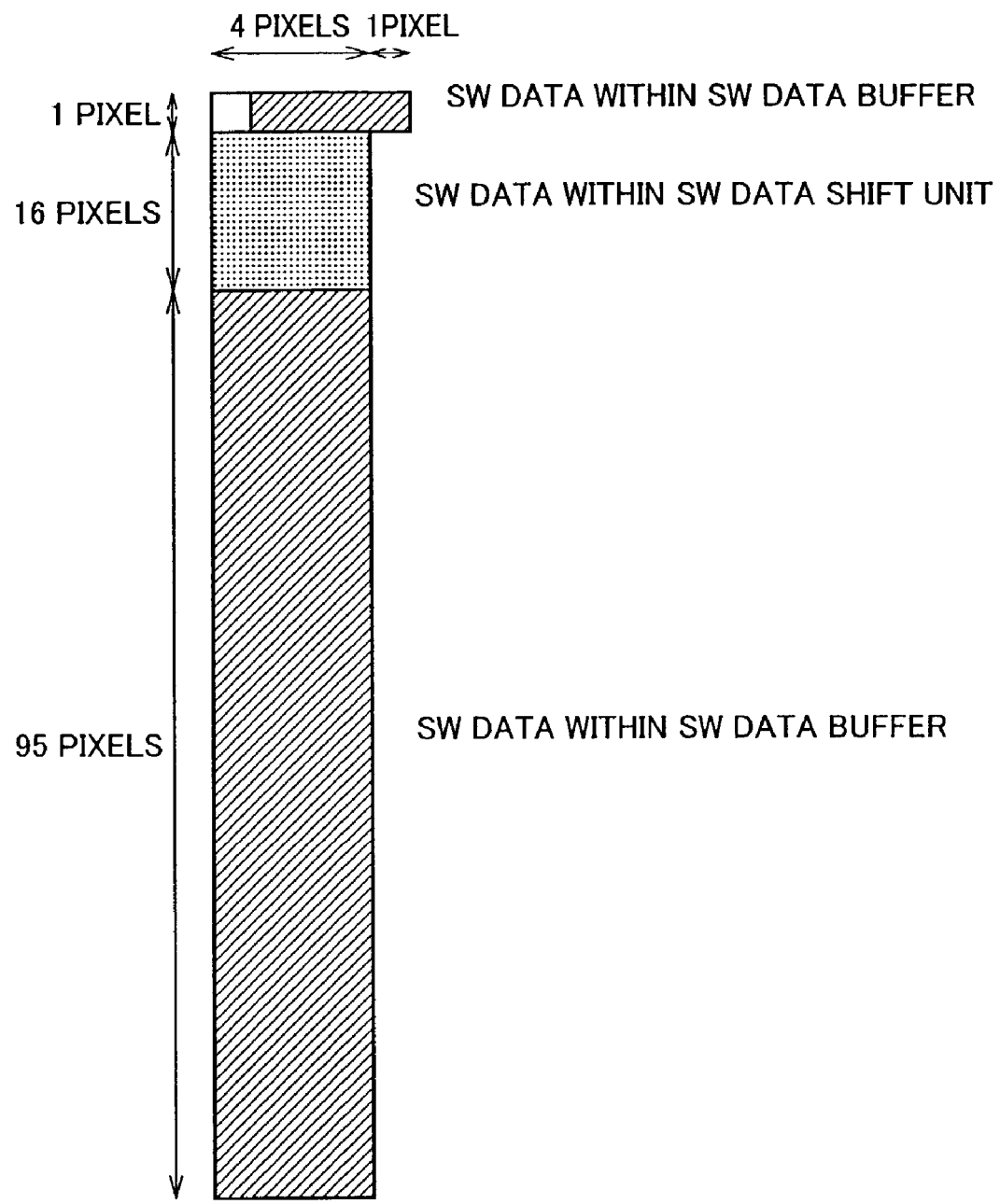
FIG. 13 shows a state of search window data in search window data shift unit 124 or 125 after one pixel thereof has been transferred.
Figure 14:
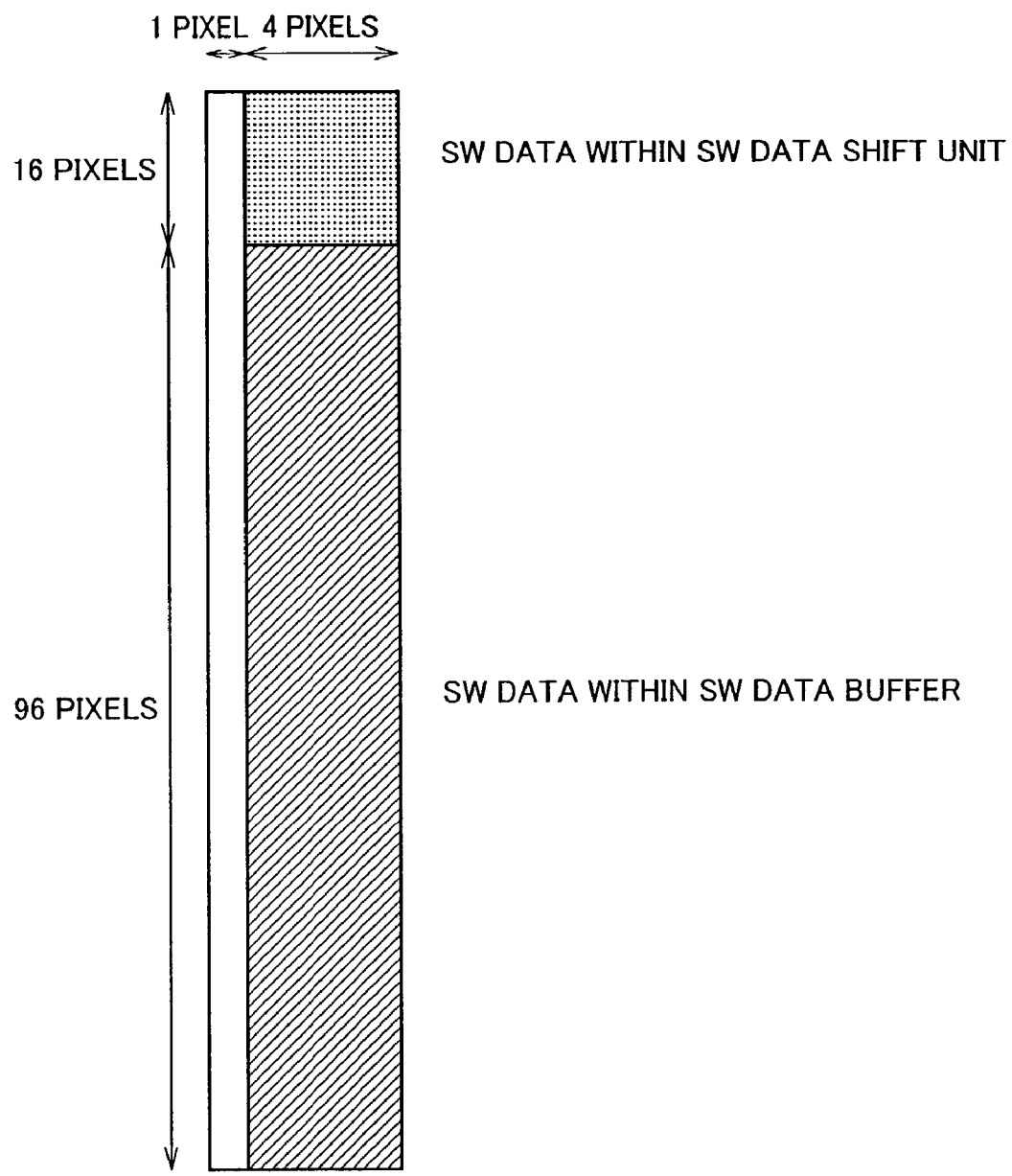
FIG. 14 shows a state permitting evaluation for a next horizontal displacement vector at a first vertical displacement point.
Figure 15:
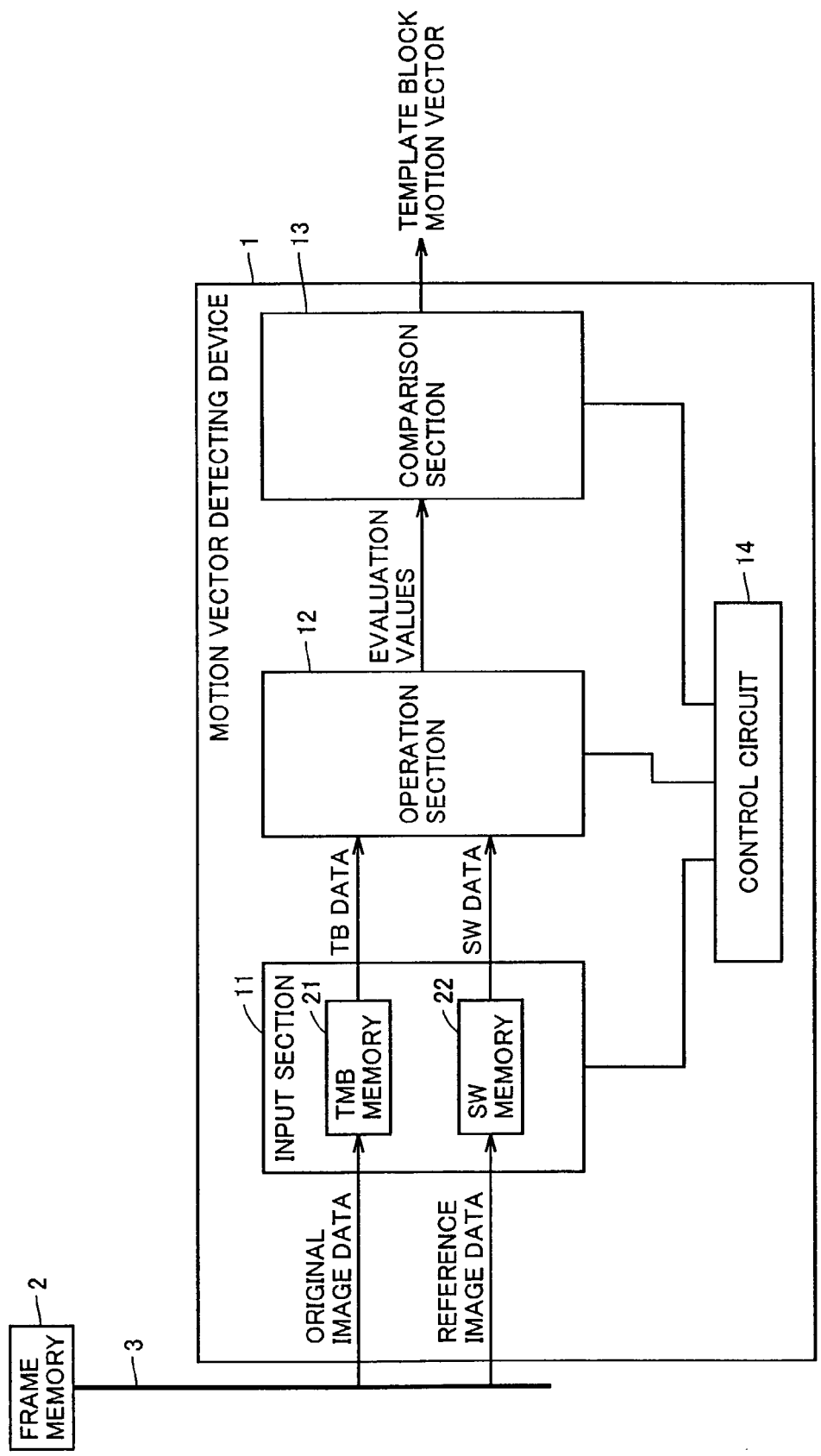
FIG. 15 is a block diagram showing a schematic configuration of a motion vector detecting device 1 according to a first embodiment of the present invention.

Referring to FIG. 15, the motion vector detecting device 1 according to the first embodiment of the present invention is for coding pixels on a frame basis. Motion vector detecting device 1 includes: an input section 11 which receives original image data and reference image data from a frame memory 2 via a system bus 3 and outputs search window (SW) data and template block (TB) data at a prescribed timing; an operation section 12 which calculates three sets of evaluation values (sums of absolute difference values) related to displacement vectors for respective template blocks based on the search window data and template block data output from input section 11; a comparison section 13 which compares the evaluation values calculated by operation section 12 to obtain minimum values for the respective evaluation values, and designates displacement vectors corresponding to the respective minimum evaluation values as motion vectors; and a control circuit 14 which performs overall control of motion vector detecting device 1.

Input section 11 includes a TMB memory 21 storing the original image data received from frame memory 2 as template block data and a SW memory 22 storing the reference image data received from frame memory 2 as search window data. Although input section 11 does not perform a filtering process on pixels of the image data in this embodiment, it may be configured to perform the filtering process as described in the background art.

Control circuit 14 controls output of the template block data from TMB memory 21 such that data of every fourth template blocks is applied to respective operation units in operation section 12. At this time, the search window data corresponding to the template block data is output from SW memory 22 to operation section 12. The internal configuration of operation section 12 is as illustrated in FIGS. 5–10 except that each operation unit processes data of every fourth template blocks, and thus, detailed description thereof is not repeated. Further, since comparison section 13 of the present embodiment is identical to conventional comparison section 103, detailed description thereof is not repeated.

Figure 16A:
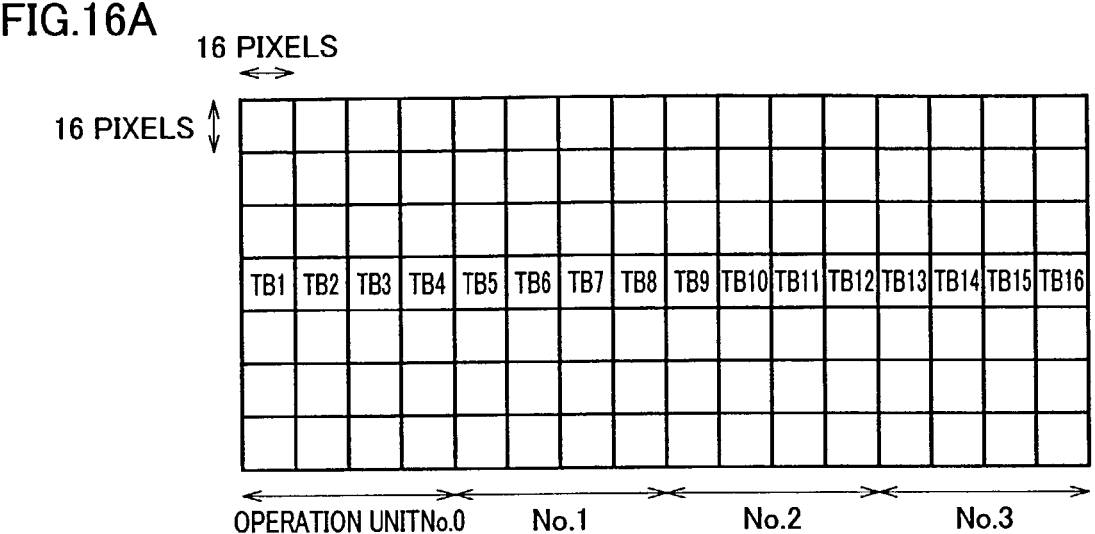
FIGS. 16A–16C illustrate an operation of motion vector detecting device 1 of the first embodiment.
Figure 16B:
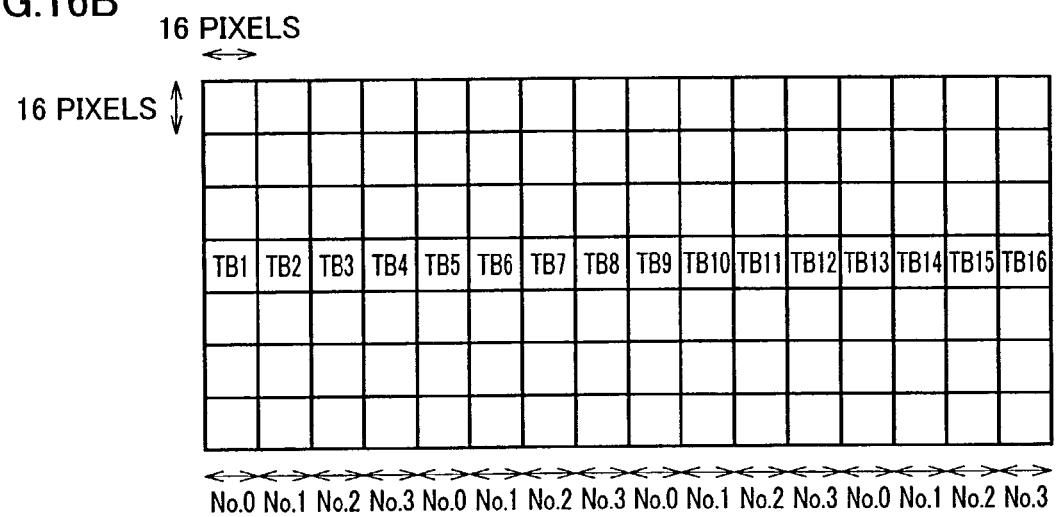
Figure 16C:
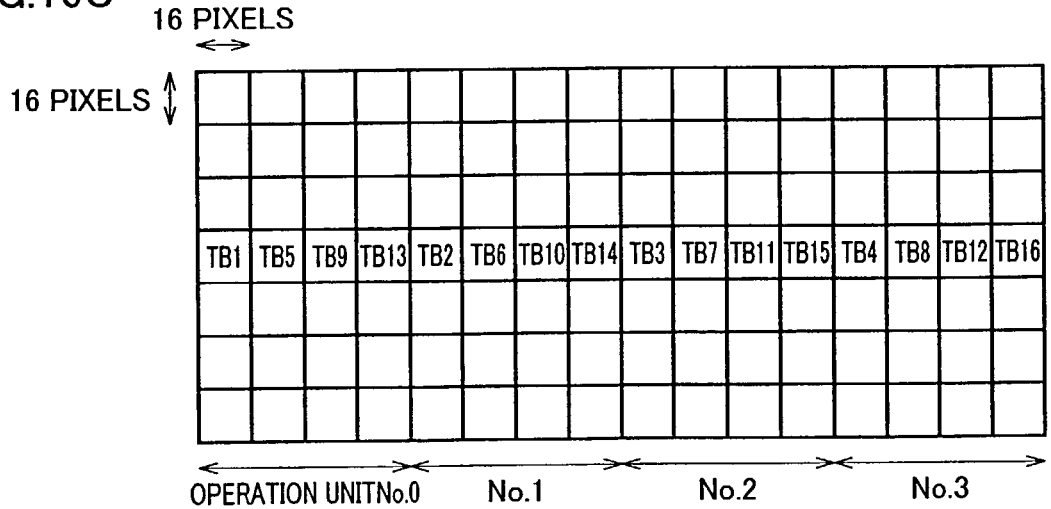

FIGS. 16A–16C illustrate the operation of motion vector detecting device 1 of the first embodiment. FIGS. 16A and 16B show a region on a display screen to be searched for motion vectors by motion vector detecting device 1, which region is divided into blocks each consisting of 16×16 pixels. In a conventional motion vector detecting device, as shown in FIG. 16A, each operation unit 120–123 within operation section 102 would process data of neighboring four template blocks. For example, operation unit 120 would process the data of neighboring four template bocks TB1–TB4.

By comparison, according to the first embodiment of the present invention, each operation unit within operation section 12 processes data of every fourth template blocks, as shown in FIG. 16B. For example, operation unit 120 processes template block data of template blocks TB1, TB5, TB9 and TB13; operation unit 121 processes template block data of template blocks TB2, TB6, TB10 and TB14; operation unit 122 processes template block data of template blocks TB3, TB7, TB11 and TB15; and operation unit 123 processes template block data of template blocks TB4, TB8, TB12 and TB16.

FIG. 16C shows the template blocks in FIG. 16B having been rearranged such that the template blocks being processed by the same operation unit become adjacent to each other.

In the conventional motion vector detecting device, the search window data would be fixed over four cycles, and evaluation values for respective template blocks would be sequentially calculated one at each cycle in the four cycles. By comparison, according to the first embodiment of the present invention, a fixed cycle period of the search window data and a number of template blocks whose data is being operated using a fixed search window are made variable. This permits search through a greater range of vertical displacement within the same operation time.

Figure 17A:
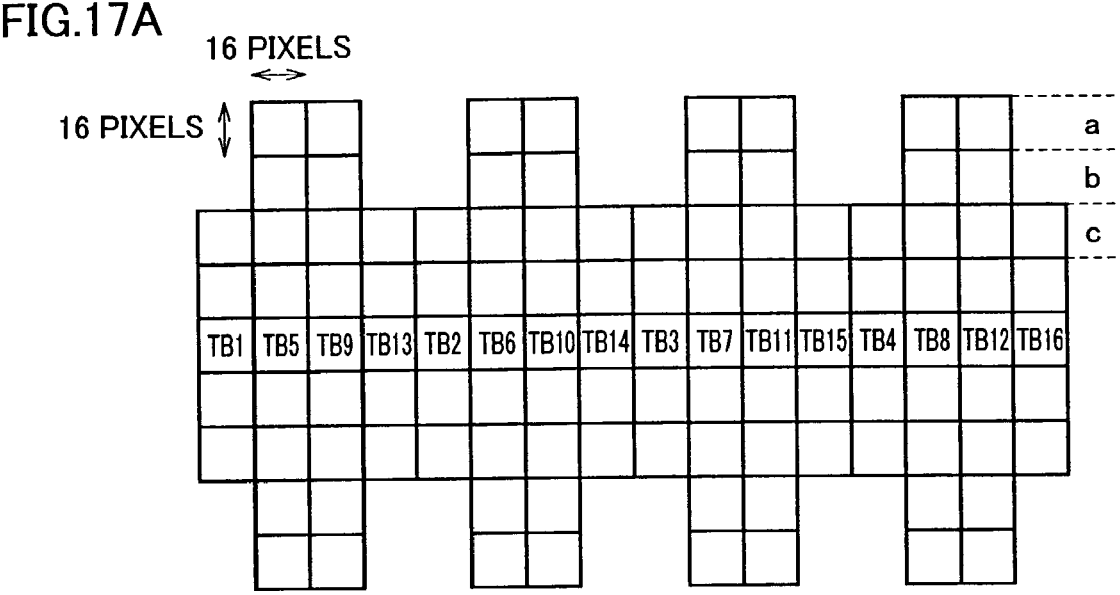
FIGS. 17A and 17B illustrate a search operation of the motion vector detecting device of the first embodiment.
Figure 17B:
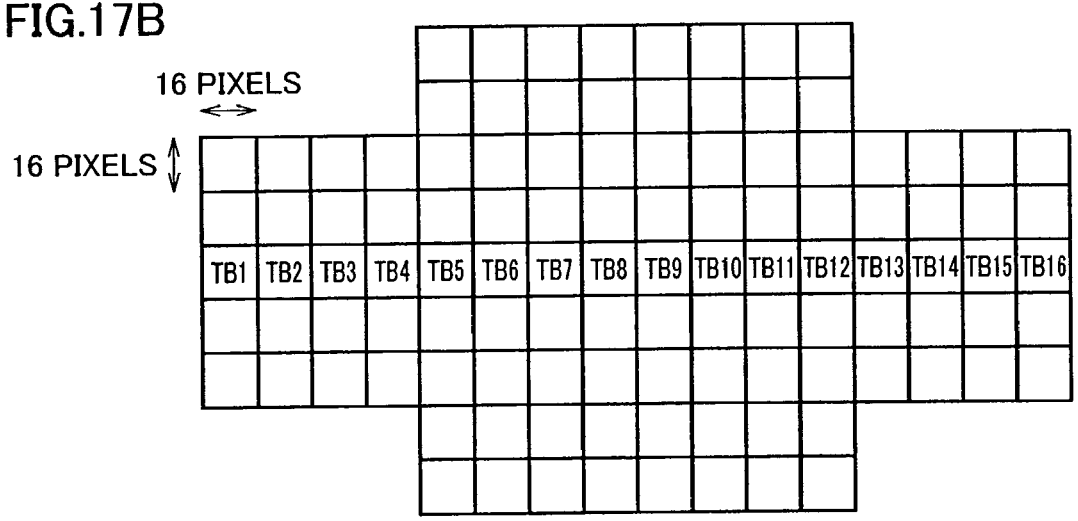

FIGS. 17A and 17B illustrate the search operation of the motion vector detecting device of the present embodiment. The number of template blocks whose data is being operated for vertical displacement of every 16 pixels is made variable. For example, in regions "a" and "b" in FIG. 17A, each operation unit within operation section 12 performs an operation on data of only two template blocks. In a region "c", each operation unit within operation section 12 performs an operation on data of four template blocks.

FIG. 17B shows a region on a display screen to be searched for motion vectors by motion vector detecting device 1 of the first embodiment. Motion vector detecting device 1 does not perform motion vector detection at four corners of the display screen, because of the reasons that motion in an oblique direction is statistically small, and that even large displacement in the oblique direction is visually not disturbing. The operation time would not be improved if conventional operation section 102 is used for motion vector detection in the region shown in FIG. 17B, since operation units 121 and 122 should perform operations for data of four template blocks even in the portions corresponding to regions "a" and "b" in FIG. 17A.

As explained above, according to the motion vector detecting device of the present embodiment, motion vector detection is not performed at four corners of the display screen, while each operation unit within operation section 12 processes data of every fourth template blocks. Thus, motion vector search in a wider range within the same operation time becomes possible, and a highly functional image coding system is established.

Second Embodiment

The motion vector detecting device according to the second embodiment of the present invention is identical in schematic configuration to that of the first embodiment shown in FIG. 15, and therefore, detailed description thereof is not repeated.

Figure 18A:
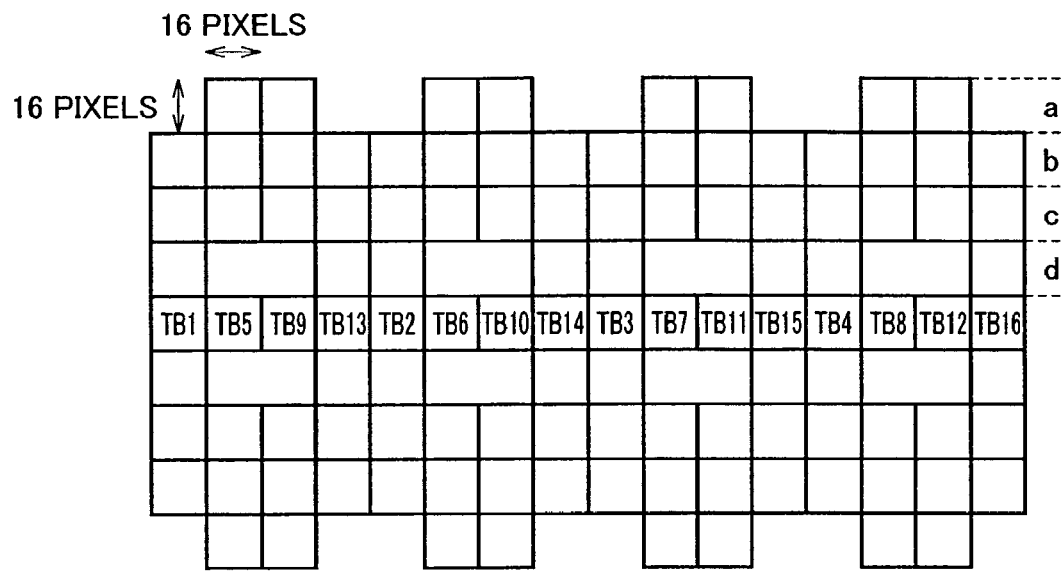
FIGS. 18A and 18B illustrate a search operation of a motion vector detecting device according to a second embodiment of the present invention.
Figure 18B:
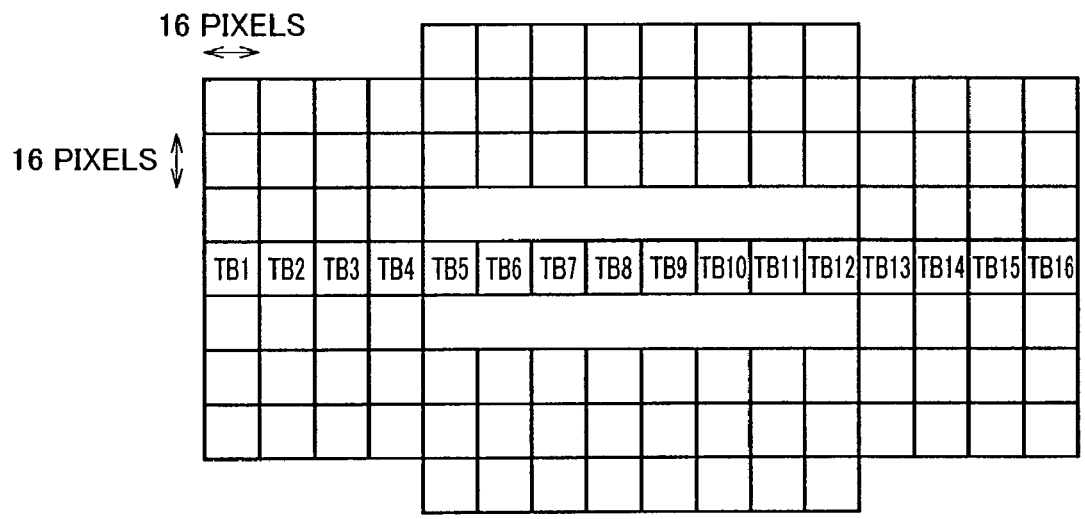

FIGS. 18A and 18B illustrate the search operation of the motion vector detecting device of the second embodiment. As shown in FIG. 18A, motion vector search is performed for discontinuous template blocks in some places, to allow for search of vertical displacement in a wider range. For example, in a region "a" in FIG. 18A, each operation unit within operation section 12 performs an operation for data of only two template blocks. In regions "b" and "c", each operation unit performs an operation on data of four template blocks. Further, in a region "d" in FIG. 18A, each operation unit within operation section 12 performs an operation for data of only two template blocks.

FIG. 18B shows a region on the display screen in which motion vector detecting device of the second embodiment performs motion vector search. Motion vector detecting device 1 does not perform motion vector detection at four corners of the display screen. In addition, it does not detect motion vectors for 16 template blocks around the center of the display screen. This is because, if two detectors different in search precision from each other are being superimposed one on another and used together for motion vector detection, as disclosed by the applicant in Japanese Patent Laying-Open No. 2000-270328, it will be unnecessary for the detector with lower precision to detect the motion vectors for the template blocks around the center of the screen.

As described above, according to the motion vector detecting device of the present embodiment, motion vector detection is left unperformed for prescribed template blocks around the center as well as at the four corners of the display screen. In addition, each operation unit within operation section 12 is made to process data of every fourth template blocks. Accordingly, motion vectors can be searched for in a wider range within the same operation time, and thus, a highly functional image coding system is realized.

Third Embodiment

The motion vector detecting device of the third embodiment of the present invention is identical to that of the first embodiment shown in FIG. 15 except that each processing element is provided with an additional template block register (TMBR4) and that the number of template blocks whose data is being held is increased to 5. Therefore, detailed description of the common configurations and functions will not be repeated.

Figure 19A:
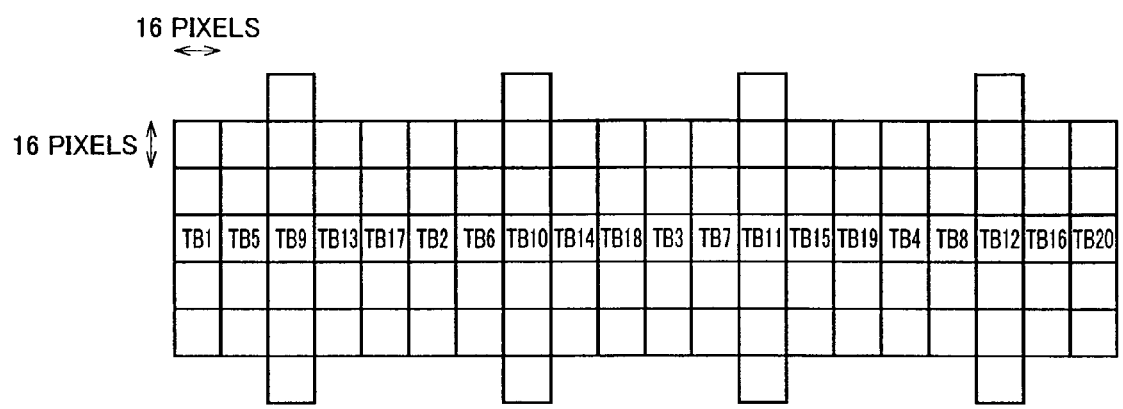
FIGS. 19A and 19B illustrate a search operation of a motion vector detecting device according to a third embodiment of the present invention.
Figure 19B:
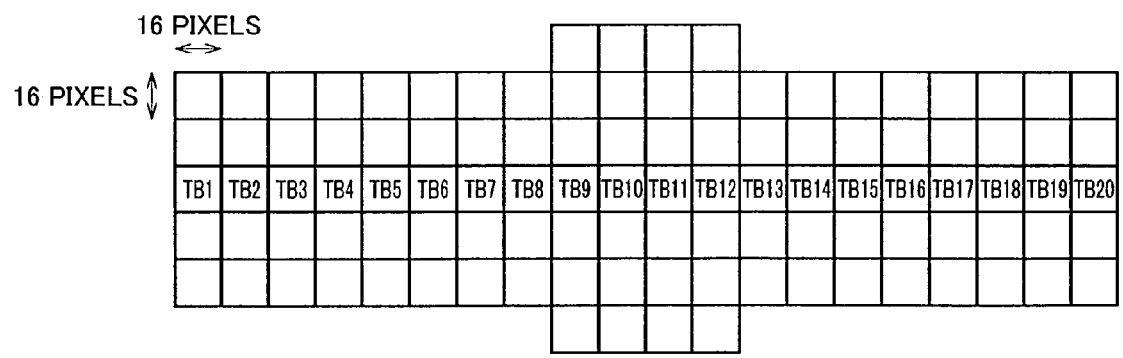

FIGS. 19A and 19B illustrate the search operation of the motion vector detecting device of the third embodiment. In this embodiment, horizontal displacement is extended (TB1–TB20), as shown in FIG. 19A. Each processing element within operation section 12 performs an operation on data of five template blocks held in template block registers TMBR0–TMBR4, thereby extending the horizontal displacement within an operation time shorter than in a conventional motion vector detecting device.

For example, in upper and lower regions shown in FIG. 19A, each operation unit within operation section 12 performs an operation of data of only one template block. In the remaining regions in FIG. 19A, each operation unit performs an operation on data of five template blocks.

FIG. 19B shows a region on the display screen to be searched for motion vectors by the motion vector detecting device of the third embodiment. The motion vector detecting device does not perform motion vector detection at four corners of the display screen, due to the same reasons as explained in the first embodiment. Although the horizontal displacement is expanded, operations are eliminated in part of the vertical displacement, so that motion vector detection is enabled in a wide range with the same operation amount as in the conventional device.

As described above, according to the motion vector detecting device of the present embodiment, motion vector detection is not performed at four corners of the display screen, and each operation unit within operation section 12 is made to process data of at most five template blocks located at every fourth blocks. Accordingly, it is possible to search for motion vectors with extended horizontal displacement within the same operation time as in the conventional case. Thus, a highly functional image coding system is established.

Fourth Embodiment

The configuration of the motion vector detecting device of the fourth embodiment of the present invention is identical to that of the third embodiment, with an additional template block register (TMBR4) provided in each processing element, and an increased number of (i.e., five) template blocks of which data is being held.

Figure 20A:
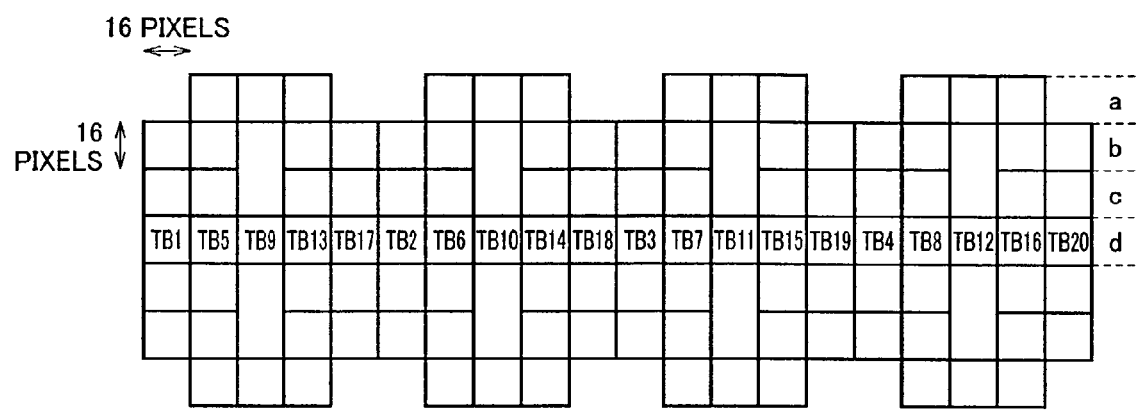
FIGS. 20A and 20B illustrate a search operation of a motion vector detecting device according to a fourth embodiment of the present invention.
Figure 20B:
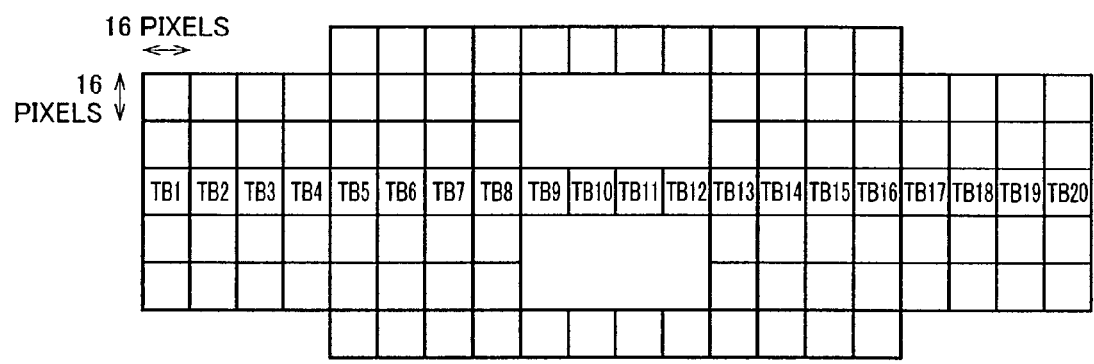

FIGS. 20A and 20B illustrate the search operation of the motion vector detecting device of the fourth embodiment. As shown in FIG. 20A, motion vector search is performed for discontinuous template blocks in some places, to make a wider range of horizontal displacement searchable. For example, in a region "a" shown in FIG. 20A, each operation unit within operation section 12 performs an operation of data of only three template blocks. In regions "b" and "c", each operation unit performs an operation for data of four template blocks. In a region "d" in FIG. 20A, each operation unit of operation section 12 performs an operation on data of five template blocks.

FIG. 20B shows a region on the display screen in which the motion vector detecting device of the fourth embodiment searches for motion vectors. This motion vector detecting device does not detect motion vectors for four corners as well as for 16 template blocks located around the center of the display screen.

As explained above, according to the motion vector detecting device of the present embodiment, motion vector detection is left unperformed for prescribed template blocks around the center as well as at the four corners of the display screen. Further, each operation unit within operation section 12 is made to process data of at most five template blocks located at every fourth blocks. Accordingly, motion vectors can be searched for with extended horizontal displacement within a less operation time than in the conventional case. Thus, a highly functional image coding system is established.

Fifth Embodiment

The motion vector detecting system according to the fifth embodiment of the present invention uses a plurality of motion vector detecting devices explained in the first embodiment, to enable search with different sub-sampling rates in different regions. The motion vector detecting system of this embodiment employs five motion vector detecting devices each having a search range of ±32 pixels in a horizontal direction and ±32 pixels in a vertical direction and with a sub-sampling rate of 2:1. The devices are arranged in a horizontal direction, so that the search range of ±160 pixels in the horizontal direction is realized.

Figure 21A:
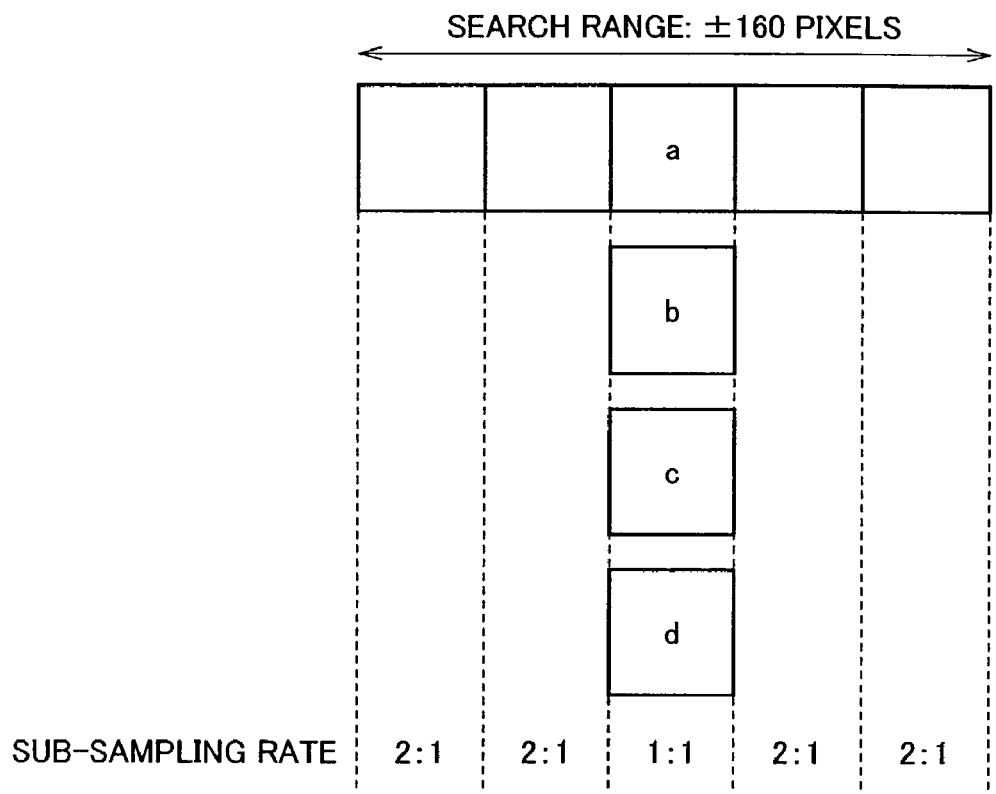
FIG. 21A is a block diagram showing a schematic configuration of a motion vector detecting system according to a fifth embodiment of the present invention.
Figure 21B:
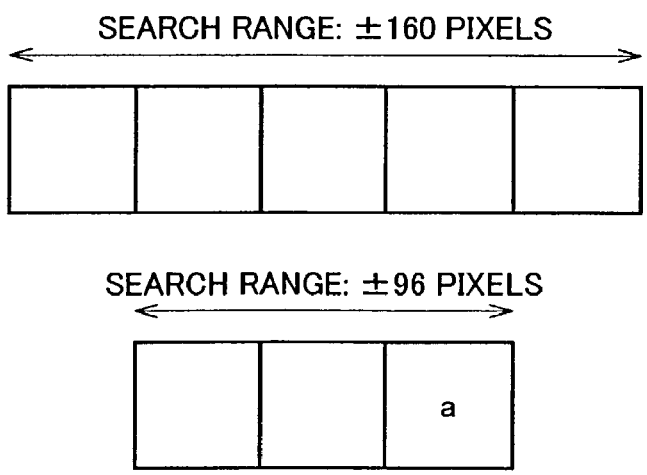
FIG. 21B shows an example of the system in the case where search is carried out with sub-sampling rates changed in a plurality of regions.
Figure 22A:
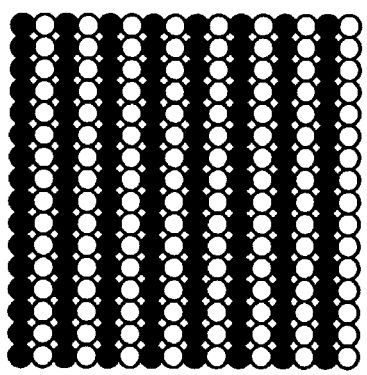
FIGS. 22A–22D show template block data and search window data being provided to respective motion vector detecting devices a–d.
Figure 22A:
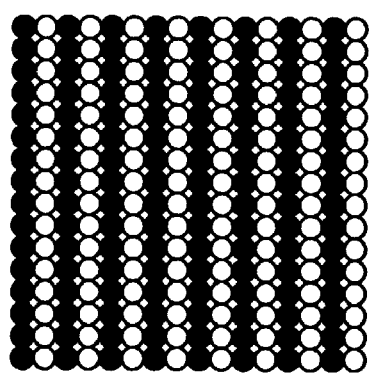
Figure 22B:
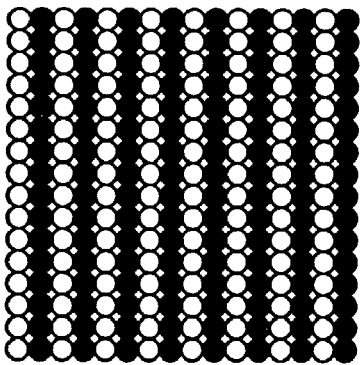
Figure 22B:
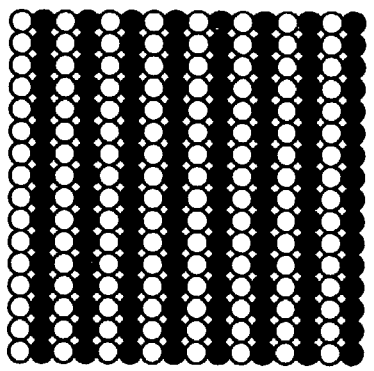
Figure 22C:
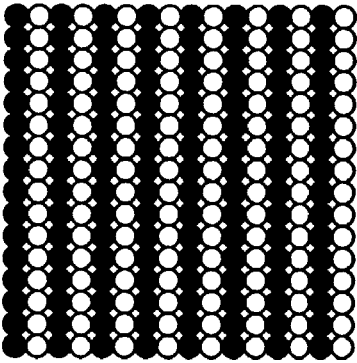
Figure 22C:
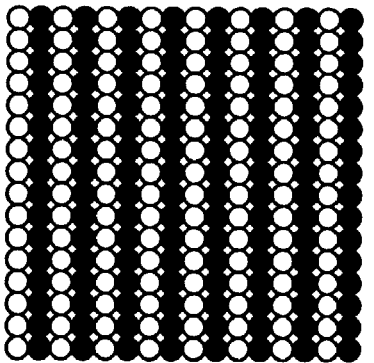
Figure 22D:
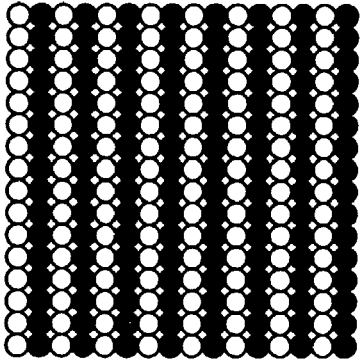
Figure 22D:
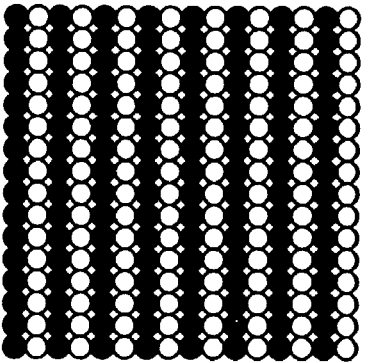

FIG. 21A is a block diagram showing a schematic configuration of the motion vector detecting system of the fifth embodiment. This motion vector detecting system employs horizontally five motion vector detecting devices each with a sub-sampling rate of 2:1. Further, it employs four motion vector detecting devices a–d each with a sub-sampling rate of 2:1 solely at the center portion, so that search is effected there with a sub-sampling rate of 1:1. FIG. 21B shows an example of the system wherein search is effected in a plurality of regions with different sub-sampling rates.

FIGS. 22A–22D show template block data and search window data being applied to respective motion vector detecting devices a–d. These template block and search window data shown in FIGS. 22A–22D are different from each other in positions being thinned out. By adding evaluation values calculated by these four motion vector detecting devices a–d, a search result with the sub-sampling rate of 1:1 is obtained.

As described above, according to the motion vector detecting system of the present embodiment, a plurality of regions are each searched using respective one of a plurality of motion vector detecting devices of sub-sampling rate of 2:1, and further, a prescribed region is searched using a plurality of motion vector detecting devices of sub-sampling rate of 2:1. Accordingly, search with different sub-sampling rates is enabled in different regions using a plurality of motion vector devices having the same sub-sampling rate. Thus, a highly functional image coding system is established.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motion vector detecting device, comprising:
   an input section inputting and holding template block data and search window data;
   an operation section having a plurality of operation units calculating evaluation values between the template block data held in said input section and the search window data held in said input section corresponding to an arbitrary displacement point therein;
   a comparison section comparing the evaluation values calculated by said operation section to detect a motion vector; and
   a control circuit controlling output of the template block data held in said input section to provide said plurality of operation units with the template block data of unadjacent template blocks that are different from each other.

2. The motion vector detecting device according to claim 1, wherein
   said operation section includes n operation units, wherein n is an integer greater than 1, and
   said control circuit controls the output of the template block data held in said input section to provide said n operation units with the template block data of every nth template blocks in a horizontal direction that are different from each other.

3. The motion vector detecting device according to claim 1, wherein said control circuit controls said input section to provide said plurality of operation units with the template block data having data of template blocks at four corners on a display screen eliminated therefrom.

4. The motion vector detecting device according to claim 1, wherein said control circuit controls said input section to provide said plurality of operation units with the template block data having data of template blocks at four corners and near the center of a display screen eliminated therefrom.

5. The motion vector detecting device according to claim 1, wherein
   said plurality of operation units each include a plurality of processing elements connected in an array,
   said plurality of processing elements each include
   a plurality of template block registers storing data of template blocks different from each other and
   an operator calculating absolute difference values between the template block data stored in said template block registers and the search window data, and
   said control circuit controls the output of the template block data held in said input section to provide said plurality of template block registers with the template block data of unadjacent template blocks that are different from each other.

6. The motion vector detecting device according to claim 5, wherein
   said plurality of processing elements each include four template block registers, and
   said control circuit controls the output of the template block data held in said input section to provide said four template block registers with the template block data of every fourth template blocks in a horizontal direction that are different from each other.

7. The motion vector detecting device according to claim 5, wherein
   said plurality of processing elements each include five template block registers, and
   said control circuit controls the output of the template block data held in said input section to provide said five template block registers with the template block data of every fourth template blocks in a horizontal direction that are different from each other.

8. A motion vector detecting system employing in a horizontal direction a plurality of motion vector detecting devices of a same sub-sampling rate to detect motion vectors in a plurality of regions, wherein
   at least one of said plurality of motion vector detecting devices is included in another plurality of motion vector detecting devices, and
   said at least one of said plurality of motion vector detecting devices and said another plurality of motion vector detecting devices perform motion vector detection employing template block data and search window data having thinned-out positions different from each other.

* * * * *